US009488184B2

(12) United States Patent
Selkin et al.

(10) Patent No.: US 9,488,184 B2
(45) Date of Patent: Nov. 8, 2016

(54) METHOD AND SYSTEM OF INCREASING WEAR RESISTANCE OF A PART OF A ROTATING MECHANISM EXPOSED TO FLUID FLOW THERETHROUGH

(75) Inventors: Vladimir Petrovich Selkin, Gomel (BY); Sergei Vasilvevich Sosnovsky, Gomel (BY); Turki Saud Mohammed Al-Saud, Riyadh (SA); Mohammed A Binhussain, Riyadh (SA); Vladimir Enokovich Agabekov, Minsk (BY)

(73) Assignee: KING ABDULAZIZ CITY FOR SCIENCE AND TECHNOLOGY, Riyadh (SA)

( * ) Notice: Subject to any disclaimer, the term of this patent is extended or adjusted under 35 U.S.C. 154(b) by 1181 days.

(21) Appl. No.: 13/461,816

(22) Filed: May 2, 2012

(65) Prior Publication Data

US 2013/0294896 A1 Nov. 7, 2013

(51) Int. Cl.

| | |
|---|---|
| ***B23K 9/04*** | (2006.01) |
| ***F04D 29/02*** | (2006.01) |
| ***F04D 7/04*** | (2006.01) |
| ***F04D 29/16*** | (2006.01) |
| ***F04D 29/22*** | (2006.01) |
| *B23K 31/02* | (2006.01) |
| *B32B 15/20* | (2006.01) |
| *F04D 29/08* | (2006.01) |

(52) U.S. Cl.

CPC ............... *F04D 29/026* (2013.01); *F04D 7/04* (2013.01); *F04D 29/167* (2013.01); *F04D 29/2294* (2013.01); *F05D 2230/313* (2013.01); *F05D 2300/173* (2013.01); *F05D 2300/1721* (2013.01); *F05D 2300/611* (2013.01); *Y10T 428/12903* (2015.01)

(58) Field of Classification Search

CPC ............. F40D 29/026; F40D 29/2294; F40D 29/167; F40D 7/04; F40D 29/12; F05D 2230/313; F05D 2300/1721; F05D 2300/173; F05D 2300/611; Y10T 428/12903

See application file for complete search history.

(56) References Cited

U.S. PATENT DOCUMENTS

| | | | |
|---|---|---|---|
| 2,465,930 | A | 3/1949 | Robinson |
| 2,680,410 | A | 6/1954 | Kolb |
| 3,318,515 | A | 5/1967 | Jones |
| 3,677,659 | A | 7/1972 | Williams |
| 3,723,019 | A | 3/1973 | Berman |
| 3,741,679 | A | 6/1973 | Johnston |
| 3,841,791 | A | 10/1974 | Doolin |

(Continued)

FOREIGN PATENT DOCUMENTS

| | | |
|---|---|---|
| EP | 2705925 A2 | 3/2014 |

*Primary Examiner* — Craig Kim
*Assistant Examiner* — Alexander White
(74) *Attorney, Agent, or Firm* — Raj Abhyanker, P.C.

(57) ABSTRACT

A method of increasing wear resistance of one or more part(s) of a rotating mechanism includes manufacturing the one or more part(s) with a portion thereof configured to be exposed to wear during fluid flow associated with the rotating mechanism having a dimension different from that of a desired dimension, applying a protective coating of an aluminum bronze alloy to the portion through welding deposition, and mechanically treating the protective coating. The method also includes applying one or more layer(s) of solid-alloy over the protective coating through electro-erosion deposition, and continuing the mechanical treatment of the protective coating and/or the one or more layer(s) of solid-alloy after the solid-alloy deposition to obtain the desired dimension of the portion.

14 Claims, 4 Drawing Sheets

(56) References Cited

U.S. PATENT DOCUMENTS

| | | | |
|---|---|---|---|
| 4,037,985 A | 7/1977 | Karassik et al. | |
| 4,073,596 A | 2/1978 | Erickson et al. | |
| 4,208,166 A | 6/1980 | Schroeder et al. | |
| 4,226,697 A | 10/1980 | Antonov et al. | |
| 4,245,952 A | 1/1981 | Eberhardt | |
| 4,793,777 A | 12/1988 | Hauenstein | |
| 4,867,633 A | 9/1989 | Gravelle | |
| 4,867,638 A | 9/1989 | Handtmann et al. | |
| 4,909,705 A | 3/1990 | Katsura et al. | |
| 4,913,619 A | 4/1990 | Haentjens et al. | |
| 4,927,327 A | 5/1990 | Keller | |
| 4,948,336 A | 8/1990 | Mosure | |
| 5,005,990 A | 4/1991 | Wotring | |
| 5,061,151 A | 10/1991 | Steiger | |
| 5,080,056 A * | 1/1992 | Kramer et al. | 123/193.4 |
| 5,133,639 A | 7/1992 | Gay et al. | |
| 5,156,522 A | 10/1992 | Tessier | |
| 5,201,642 A | 4/1993 | Hinckley | |
| 5,318,840 A | 6/1994 | Ikeda et al. | |
| 5,358,378 A | 10/1994 | Holscher | |
| 5,873,697 A | 2/1999 | Gully | |
| 5,971,704 A | 10/1999 | Blattmann | |
| 6,004,094 A | 12/1999 | Precetti | |
| 6,012,900 A * | 1/2000 | Kennedy et al. | 415/199.2 |
| 6,037,067 A * | 3/2000 | Fujiki et al. | 428/652 |
| 6,129,507 A | 10/2000 | Ganelin | |
| 6,234,748 B1 | 5/2001 | Brown et al. | |
| 6,293,739 B1 | 9/2001 | Uchino et al. | |
| 6,333,103 B1 | 12/2001 | Ishii et al. | |
| 6,426,476 B1 * | 7/2002 | Senor et al. | 219/76.13 |
| 6,494,675 B2 | 12/2002 | Pesek et al. | |
| 6,756,111 B1 * | 6/2004 | Okada et al. | 428/216 |
| 6,790,543 B2 | 9/2004 | Kubota et al. | |
| 6,797,080 B2 | 9/2004 | Mori et al. | |
| 6,869,334 B1 | 3/2005 | Leyendecker et al. | |
| 7,048,495 B2 | 5/2006 | Osgood | |
| 7,754,350 B2 | 7/2010 | Freling et al. | |
| 7,820,308 B2 | 10/2010 | Park et al. | |
| 7,935,431 B2 | 5/2011 | Poncin et al. | |
| 7,946,810 B2 | 5/2011 | Towsley et al. | |
| 7,985,703 B2 | 7/2011 | Freling | |
| 8,608,445 B2 | 12/2013 | Burgess et al. | |
| 2003/0049387 A1 | 3/2003 | Mori et al. | |
| 2005/0072269 A1 * | 4/2005 | Banerjee | C23C 30/005 75/240 |
| 2007/0259194 A1 * | 11/2007 | Freling et al. | 428/469 |
| 2012/0196137 A1 | 8/2012 | Vetter | |

* cited by examiner

| TEST RESULTS 302 | PREVIOUS METHOD 304 | CURRENT METHOD 306 |
|---|---|---|
| HARDNESS OF COATING (MPa) | 220 | 1800 |
| WEAR OF COATING (μm) | 7 | 1 |

FIGURE 3

METHOD AND SYSTEM OF INCREASING WEAR RESISTANCE OF A PART OF A ROTATING MECHANISM EXPOSED TO FLUID FLOW THERETHROUGH

FIELD OF TECHNOLOGY

This disclosure relates generally to mechanical rotating mechanisms, and more particularly, to a method, an apparatus and/or a system of increasing wear resistance of a part of a rotating mechanism exposed to fluid flow therethrough.

BACKGROUND

A rotating mechanism such as a centrifugal pump may be utilized to pump fluids including abrasive materials. One or more part(s) (e.g., seal ring(s) in a centrifugal pump, impeller of the centrifugal pump) of the rotating mechanism may be constantly worn down due to the exposure thereof to the fluid flow. The aforementioned one or more part(s) may be manufactured with a material having a coefficient of thermal expansion different from that of a metal constituting a working wheel (e.g., impeller) of the rotating mechanism. However, the aforementioned material may not be suitable for fluids including significant abrasive impurities (e.g., fluids obtained from boreholes of water, raw oil).

The presence of significant abrasive impurities may wear down the one or more part(s) such that a clearance between elements of the rotating mechanism engaged through the one or more part(s) may be increased. When the clearance increases, volumetric losses associated with the rotating mechanism also increase, thereby reducing the efficiency of the rotating mechanism.

SUMMARY

Disclosed are a method, a system and/or an apparatus of increasing wear resistance of a part of a rotating mechanism exposed to fluid flow therethrough.

In one aspect, a method of increasing wear resistance of one or more part(s) of a rotating mechanism includes manufacturing the one or more part(s) with a portion thereof configured to be exposed to wear during fluid flow associated with the rotating mechanism having a dimension different from that of a desired dimension, applying a protective coating of an aluminum bronze alloy to the portion through welding deposition, and mechanically treating the protective coating. The method also includes applying one or more layer(s) of solid-alloy over the protective coating through electro-erosion deposition, and continuing the mechanical treatment of the protective coating and/or the one or more layer(s) of solid-alloy after the solid-alloy deposition to obtain the desired dimension of the portion.

In another aspect, a part of a rotating mechanism having increased wear resistance to fluid flow associated with the rotating mechanism includes a portion configured to be exposed to wear during the fluid flow associated with the rotating mechanism. The portion is manufactured to have a dimension different from that of a desired dimension thereof. The portion includes a protective coating of an aluminum bronze alloy deposited thereon through welding, and one or more layer(s) of solid-alloy deposited over the protective coating through an electro-erosion process. The protective coating is mechanically treated after deposition thereof, and the mechanical treatment of the protective coating and/or the one or more layer(s) of solid-alloy is continued after the solid-alloy deposition to obtain the desired dimension of the portion.

In yet another aspect, a rotating mechanism includes a part having an increased wear resistance to fluid flow associated with the rotating mechanism. The part includes a portion configured to be exposed to wear during the fluid flow associated with the rotating mechanism. The portion is manufactured to have a dimension different from that of a desired dimension thereof. The portion includes a protective coating of an aluminum bronze alloy deposited thereon through welding, and one or more layer(s) of solid-alloy deposited over the protective coating through an electro-erosion process. The protective coating is mechanically treated after deposition thereof. The mechanical treatment of the protective coating and/or the one or more layer(s) of solid-alloy is continued after the solid-alloy deposition to obtain the desired dimension of the portion.

The methods and systems disclosed herein may be implemented in any means for achieving various aspects. Other features will be apparent from the accompanying drawings and from the detailed description that follows.

BRIEF DESCRIPTION OF THE DRAWINGS

Example embodiments are illustrated by way of example and not a limitation in the figures of accompanying drawings, in which like references indicate similar elements and in which:

FIG. 3 is a table showing test results performed on a part of the centrifugal pump of FIG. 1 based on a current method of increasing wear resistance of the part and a previous method.

Other features of the present embodiments will be apparent from accompanying Drawings and from the Detailed Description that follows.

DETAILED DESCRIPTION

Disclosed are a method, an apparatus and/or a system of increasing wear resistance of a part of a rotating mechanism exposed to fluid flow therethrough. Although the present embodiments have been described with reference to specific example embodiments, it will be evident that various modifications and changes may be made to these embodiments without departing from the broader spirit and scope of the various embodiments.

Figure 1:
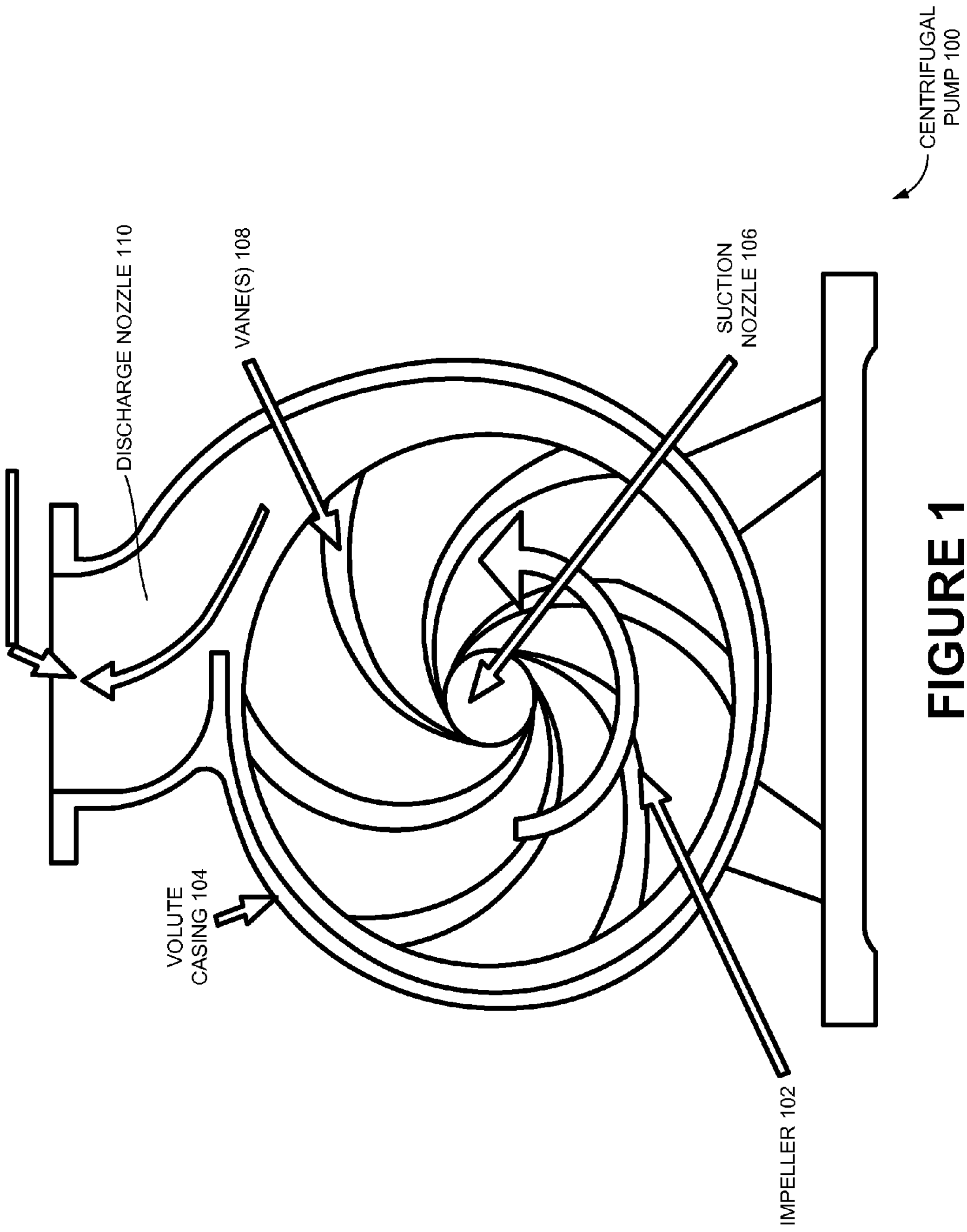
FIG. 1 is a schematic view of a cross-section of a centrifugal pump, according to one or more embodiments.

FIG. 1 shows a cross-section of centrifugal pump 100, according to one or more embodiments. In one or more embodiments, centrifugal pump 100 may include impeller 102 configured to be a rotating part thereof that converts the energy of a driver (e.g., a motor, a turbine) into kinetic energy. In one or more embodiments, by way of a stationary volute casing 104 of impeller 102, the kinetic energy is then converted into pressure energy of a fluid that is being pumped. In one or more embodiments, the fluid may enter centrifugal pump 100 through suction nozzle 106 provided in volute casing 104 of impeller 102 into the center of impeller 102, which, due to rotation thereof, spins the fluid in cavities between vanes 108 thereof outward and provides centrifugal acceleration.

Thus, in one or more embodiments, as the fluid leaves the center of impeller 102, low pressure is created at the inlet thereat, thereby causing more fluid to flow toward the inlet. In one or more embodiments, the curvature of vanes 108 (or, blades) may enable the centrifugal acceleration or the force therefrom to push the fluid in a tangential and a radial direction. In one or more embodiments, the kinetic energy of the fluid emerging out of impeller 102 may encounter a resistance to the flow thereof, firstly created by volute casing 104 that slows down the fluid, and then at discharge nozzle 110, where the kinetic energy is converted to pressure energy and the fluid forced into discharge piping (not shown). One of ordinary skill in the art would be familiar with the working of centrifugal pump 100, and, therefore, additional details thereof have been skipped for the sake of convenience and brevity.

Figure 2:
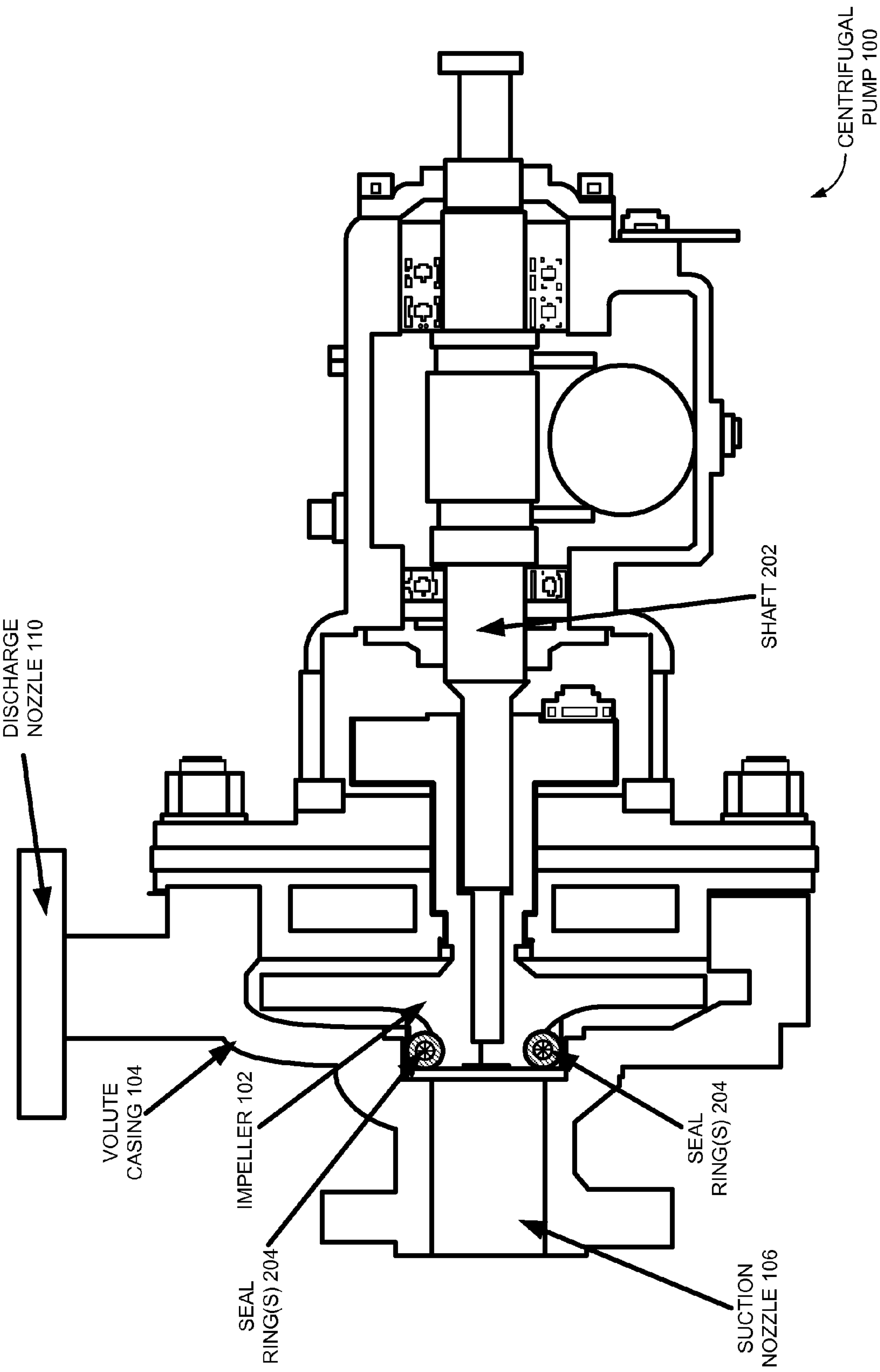
FIG. 2 is a schematic view of a plane of the centrifugal pump of FIG. 1, according to one or more embodiments.

FIG. 2 shows a planar view of centrifugal pump 100, according to one or more embodiments. In one or more embodiments, the rotating components of centrifugal pump 100 may include impeller 102 and shaft 202. In one or more embodiments, volute casing 104 may serve to help balance the hydraulic pressure on shaft 202. In one or more embodiments, as shown in FIG. 2, impeller 102 may be attached to volute casing 104 by way of one or more seal ring(s) 204. In one or more embodiments, an analysis of efficiency of centrifugal pump 100 may take into account mechanical, hydraulic and volumetric losses associated therewith. In one or more embodiments, mechanical losses may occur due to mechanical components within centrifugal pump 100, hydraulic losses may be caused by friction between walls of centrifugal pump 100 and/or acceleration/deceleration/directional changes of the fluid within centrifugal pump 100, and volumetric losses may occur due to leakage of the fluid between impeller 102 and volute casing 104.

Thus, in one or more embodiments, volumetric losses in centrifugal pump 100 may be caused by the presence of clearances in slot-hole sealing(s), located between impeller 102 and volute casing 104 and accomplished through seal ring(s) 204, or, between individual seal ring(s) 204. In one or more embodiments, volumetric losses may be enhanced due to the separation of high pressure region(s) and low pressure region(s) of centrifugal pump 100 by such slot-hole sealing(s). To reduce the aforementioned volumetric losses, seal ring(s) 204 made of thermoplastic polymer material may be utilized that, due to a coefficient of thermal expansion thereof being different from that of the metal utilized in impeller 102, leads to a decrease in the value of clearance between an inner diameter of a seal ring 204 and an outer diameter of impeller 102. While this may enable an increase in the efficiency of centrifugal pump 100, the aforementioned solution may not be effective when centrifugal pump 100 is utilized to pump fluids including abrasive impurities (e.g., liquid obtained from boreholes of water, raw oil) because the constancy of the mechanic wear process actually leads to a decrease in the efficiency of centrifugal pump 100.

Increasing wear resistance of the material constituting impeller 102 and seal ring(s) 204 may enable decreasing volumetric losses in centrifugal pump 100 when fluids including abrasive impurities are pumped therethrough. Wear-resistant metal alloy coatings may be employed for the aforementioned purpose. First, the part (e.g., impeller 102, seal ring(s) 204) may be manufactured with a size of the surface exposed to wear being less than the required size. Then, the metal alloy (e.g., aluminum bronze) coating may be applied through melting and the part mechanically treated to the desired size thereof. While the aforementioned technique may be largely effective, the resistance(s) of existing kinds of metal alloys such as aluminum bronze may not be sufficient enough to tackle fluids including high concentration(s) of abrasive particles such as sand.

In one or more embodiments, a method of increasing wear resistance of part(s) of centrifugal pump 100 that overcomes limitations associated with the other method(s) discussed above is disclosed herein. In one or more embodiments, a desired part (e.g., impeller 102, seal ring(s) 204) of centrifugal pump 100 may first be manufactured with a size of a surface thereof most exposed to abrasive wear being different from a required size by a thickness of a protective coating to be applied on the surface. In other words, in one or more embodiments, the size of the surface may be equal to the difference between the required size and the thickness of the protective coating. In one or more embodiments, a layer of metal alloy coating (e.g., aluminum bronze) may then be melted on the surface through, for example, Metal Inert Gas (MIG)/Metal Active Gas (MAG) welding. In one example embodiment, the metal alloy may be based on copper containing 6-10% aluminum and 9-18% of manganese, iron and nickel to be used as aluminum bronze. In one or more embodiments, the metal alloy coatings may be well applicable on steel surfaces, and may be sufficiently wear resistant with high corrosion resistance to water and, even, salt water (e.g., sea water). In one or more embodiments, the melting of the metal alloy coating (e.g., aluminum bronze) may be conducted using an electric arc on the surface of a part (e.g., impeller 102, seal ring(s) 204) of centrifugal pump 100.

In one or more embodiments, following the application of the protective coating, mechanical treatment (e.g., turning, milling, grinding; mechanical treatment depending on the detail required) of the coating is performed. In one or more embodiments, then a layer of solid-alloy coating based on small-grained carbides of metals (e.g., tungsten, vanadium, chromium) may be applied on top of the metal alloy (e.g., aluminum bronze) coating. In one or more embodiments, the process of applying the layer of solid-alloy coating may involve electro-erosion, with an electrode made of the solid-alloy and transfer of the metal carbide particles on the surface of the part. In one or more embodiments, different kinds of single-carbide and multi-carbide solid alloys including 6-12% cobalt (serving as binding agent) and carbides of metals may be used as the material for the electrode.

In one or more embodiments, the micro-hardness of the top layer of the protective coating may be increased several times based on the thickness of the layer and the kind of solid-alloy. In one or more embodiments, it may not be feasible to utilize alloys including less than 6% of cobalt or more than 12% of cobalt due to the lowering of wear resistance of the protective coating caused by the surface thereof becoming fragile or the lowering of the micro-solidness respectively. In one or more embodiments, therefore, it may be preferable to use solid alloys based on, for example, tungsten carbide, with the addition of vanadium carbide and chromium carbide for high solidness and wear resistance thereof.

In one or more embodiments, application of the coating through electro-erosion may be conducted using standard equipment therefor. In one or more embodiments, the model of one or more device(s) constituting the standard equipment may be chosen based on a required thickness of the layer of the solid-alloy coating. In one or more embodiments, the maximum achievable thickness of the layer of the solid-alloy coating and a given productivity of the process of the application thereof directly depend on a value of the electrode current in the electro-erosion process when the working value of the current is 0.5-20 amperes. In one or more embodiments, it may be desirable to apply two or more layers of the solid-alloy coatings (e.g., up to 10 layers) in order to achieve uniformity thereof and to reduce surface roughness. In one or more embodiments, each of the layers of solid-alloy coatings may have the same chemical composition (and, hence, properties). Alternately, in one or more embodiments, at least two of the layers of solid-alloy coatings may have different chemical composition.

In one or more embodiments, the electrode involved in the electro-erosion deposition process may be made of solid-alloy that optimally includes 6-12% of cobalt and 88-94% of carbides of tungsten, chromium and vanadium.

Now example experimental results associated with an impeller 102 made of molding steel is discussed herein. Firstly, mechanical treatment of the surface of impeller 102 in the area(s) of the slot-hole sealing, separating suction and forcing chambers was done to a size (252 mm) different from the required size of 254 mm through a lathe. Following the mechanical treatment, an aluminum bronze coating was melted onto the surface using a Nobitec SW 517 wire of 0.8 mm diameter in an inert gas medium (argon) on Kuhtreiber®'s KIT-384 apparatus. The composition of melted metal was 6.5% aluminum, 2.6% nickel, 12.5% manganese, 0.02% lead and the rest copper Impeller 102 was fixed on a welder's table. After the application of the aluminum bronze coating, the mechanical treatment thereof was conducted on a lathe to a size lesser than that required by the thickness of a planned solid-alloy coating (30 μm). The thickness of a coating was 0.97 mm The hardness of the aluminum bronze coating was 220 MPa as per the Vickers test, and was measured as an average of five readings.

Following the hardness measurement, five layers of solid-alloy coating were applied until the thickness thereof was 30 μm. The final diameter of impeller 102 on the surface being strengthened was 254 mm Hardness of the resulting solid-alloy coating was 1800 MPa. A rod made of solid alloy U8 from Tribo Hartmetall melted from powder having a grain size of 0.5 μm (8% cobalt, 91% tungsten carbide, 1% chromium carbide and vanadium carbide) was used as the electrode in the electro-erosion process.

Moreover, tests on abrasive wear resistance during friction of the surface were additionally conducted on a specimen of melted steel including 0.3% of carbon, assuming water as the fluid. For a slot-hole clearance of 0.2 mm and water having sand-particles with friction composition of 100-300 μm being delivered to the clearance, speed of rotation shaft 202 being 1500 rpm and a test duration of 100 hours, FIG. 3 shows test results 302 including hardness of a coating for a prototype associated with a previous method 304 of applying the metal coating and the current method 306 discussed above. The hardness of the coating is 220 MPa as per the Vickers test for the previous method 304 and 1800 MPa for the current method 306. Also, the wear of coating is 7 μm for the previous method 304 and 1 μm for the current method 306.

Thus, exemplary embodiments described within the context of current method 306 provide for a method of increasing wear resistance of one or more part(s) of centrifugal pump 100. While exemplary embodiments have been discussed within the context of a centrifugal pump 100, the same method (e.g., current method 306) applies to increasing wear resistance of one or more part(s) of any rotating mechanism (e.g., turbines) configured to have fluid flow therethrough. The concepts discussed herein, therefore, are not limited to merely a centrifugal pump 100.

Figure 4:
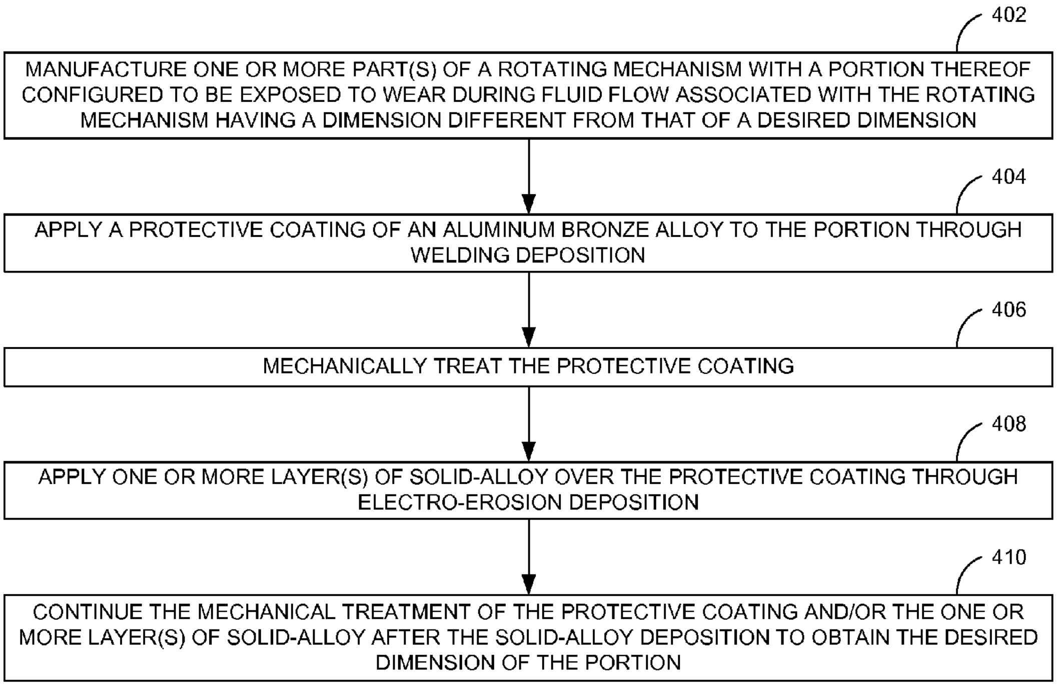
FIG. 4 is a process flow diagram detailing the operations involved in a method of increasing wear resistance of a part of a rotating mechanism such as the centrifugal pump of FIG. 1 exposed to fluid flow therethrough, according to one or more embodiments.

FIG. 4 shows a process flow diagram detailing the operations involved in a method of increasing wear resistance of one or more part(s) (e.g., seal ring(s) 204, impeller 102) of a rotating mechanism (e.g., centrifugal pump 100) exposed to fluid flow therethrough, according to one or more embodiments. In one or more embodiments, operation 402 may involve manufacturing the one or more part(s) of the rotating mechanism with a portion thereof configured to be exposed to wear during the fluid flow associated with the rotating mechanism having a dimension different from that of a desired dimension. In one or more embodiments, operation 404 may involve applying a protective coating of an aluminum bronze alloy to the portion through welding deposition. In one or more embodiments, operation 406 may involve mechanically treating the protective coating.

In one or more embodiments, operation 408 may involve applying one or more layer(s) of solid-alloy over the protective coating through electro-erosion deposition. In one or more embodiments, operation 410 may then involve continuing the mechanical treatment of the protective coating and/or the one or more layer(s) of solid-alloy after the solid-alloy deposition to obtain the desired dimension of the portion.

Although the present embodiments have been described with reference to specific example embodiments, it will be evident that various modifications may be made to these embodiments without departing from the broader spirit and scope of the various embodiments. Accordingly, the specification and the drawings are regarded in an illustrative rather than a restrictive sense.

What is claimed is:

1. A method of increasing wear resistance of at least one part of a rotating mechanism, comprising:

manufacturing the at least one part of the rotating mechanism with a portion thereof configured to be exposed to wear during fluid flow associated with the rotating mechanism having a dimension different from that of a final dimension by a thickness of a protective coating to be applied thereon;

melting the protective coating of an aluminum bronze alloy to the portion having the different dimension through welding deposition, the aluminum bronze alloy having a chemical composition of 6-10% aluminum and 9.5-18% of a plurality of metals including manganese, iron and nickel, with copper constituting a remaining chemical composition thereof, and the welding being one of: Metal Inert Gas welding and Metal Active Gas welding;

mechanically treating the melted protective coating;

applying at least one layer of solid-alloy over the mechanically treated melted protective coating through electro-erosion deposition, the electro-erosion involving:

maintaining a micro-solidness of the at least one layer of solid-alloy by constraining the percentage of cobalt between 6-12%, minimizing a fragility of the at least one layer of solid-alloy by constraining the percentage of cobalt between 6-12%, utilizing an electrode made of the solid alloy having a chemical composition of 6-12% cobalt and 88-94% carbides of a plurality of metals including tungsten carbide, chromium carbide and vanadium carbide, and transferring particles of the solid alloy onto the mechanically treated melted protective coating in accordance with the utilization of the electrode; and continuing the mechanical treatment of at least one of the melted protective coating and the applied at least one layer of the solid-alloy after the solid-alloy deposition to obtain the final dimension of the portion.

2. The method of claim 1, comprising applying a plurality of layers of the solid-alloy over the mechanically treated melted protective coating through the electro-erosion deposition.

3. The method of claim 2, comprising applying the plurality of layers such that one of:

each layer of the plurality of layers of the solid-alloy has a same chemical composition, and one layer of the plurality of layers of the solid-alloy has a chemical composition different from at least one other layer of the plurality of layers of the solid-alloy.

4. The method of claim 1, comprising performing the welding deposition through an electric arc.

5. The method of claim 1, wherein the rotating mechanism is a centrifugal pump, and wherein the part of the rotating mechanism is one of: an impeller and a seal ring of the centrifugal pump.

6. A part of a rotating mechanism having increased wear resistance to fluid flow associated with the rotating mechanism comprising:

a portion configured to be exposed to wear during the fluid flow associated with the rotating mechanism, the portion being manufactured to have a dimension different from that of a final dimension thereof by a thickness of a protective coating to be applied thereon, and the portion comprising:

a protective coating of an aluminum bronze alloy melted on the portion having the different dimension through welding deposition, the aluminum bronze alloy having a chemical composition of 6-10% aluminum 9.5-18% of a plurality of metals including manganese, iron and nickel, with copper constituting a remaining chemical composition thereof, the welding being one of: Metal Inert Gas welding and Metal Active Gas welding, and the melted protective coating being mechanically treated after the welding deposition, and at least one layer of solid-alloy applied over the mechanically treated melted protective coating through an electro-erosion deposition process, the electro-erosion involving:

maintaining a micro-solidness of the at least one layer of solid-alloy by constraining the percentage of cobalt between 6-12%, minimizing a fragility of the at least one layer of solid-alloy by constraining the percentage of cobalt between 6-12%, utilization of an electrode made of the solid alloy having a chemical composition of 6-12% cobalt and 88-94% carbides of a plurality of metals including tungsten carbide, chromium carbide and vanadium carbide, and transfer of particles of the solid alloy onto the mechanically treated melted protective coating in accordance with the utilization of the electrode, wherein the mechanical treatment of at least one of the melted protective coating and the at least one layer of the solid-alloy is continued after the solid-alloy deposition to obtain the final dimension of the portion.

7. The part of claim 6, wherein the portion includes a plurality of layers of the solid-alloy deposited over the mechanically treated melted protective coating through the electro-erosion deposition process.

8. The part of claim 7, wherein the plurality of layers is deposited such that one of:

each layer of the plurality of layers of the solid-alloy has a same chemical composition, and one layer of the plurality of layers of the solid-alloy has a chemical composition different from at least one other layer of the plurality of layers of the solid-alloy.

9. The part of claim 6, wherein the welding deposition of the aluminum-bronze alloy is performing using an electric arc.

10. The part of claim 6, wherein the part of the rotating mechanism is one of: an impeller and a seal ring of a centrifugal pump.

11. A rotating mechanism, comprising:

a part having an increased wear resistance to fluid flow associated with the rotating mechanism, the part comprising:

a portion configured to be exposed to wear during the fluid flow associated with the rotating mechanism, the portion being manufactured to have a dimension different from that of a final dimension thereof by a thickness of a protective coating to be applied thereon, and the portion comprising:

a protective coating of an aluminum bronze alloy melted on the portion having the different dimension through welding deposition, the aluminum bronze alloy having a chemical composition of 6-10% aluminum and 9.5-18% of a plurality of metals including manganese, iron and nickel, with copper constituting a remaining chemical composition thereof, the welding being one of: Metal Inert Gas welding and Metal Active Gas welding, and the melted protective coating being mechanically treated after the welding deposition, and at least one layer of solid-alloy applied over the mechanically treated melted protective coating through an electro-erosion deposition process, the electro-erosion involving:

maintaining a micro-solidness of the at least one layer of solid-alloy by constraining the percentage of cobalt between 6-12%, minimizing a fragility of the at least one layer of solid-alloy by constraining the percentage of cobalt between 6-12%, utilization of an electrode made of the solid alloy having a chemical composition of 6-12% cobalt and 88-94% carbides of a plurality of metals including tungsten carbide, chromium carbide and vanadium carbide, and transfer of particles of the solid alloy onto the mechanically treated melted protective coating in accordance with the utilization of the electrode, wherein the mechanical treatment of at least one of the melted protective coating and the at least one layer of the solid-alloy is continued after the solid-alloy deposition to obtain the final dimension of the portion.

12. The rotating mechanism of claim 11, wherein the portion includes a plurality of layers of the solid-alloy deposited over the mechanically treated melted protective coating through the electro-erosion deposition process.

13. The rotating mechanism of claim 12, wherein the plurality of layers is deposited such that one of:

each layer of the plurality of layers of the solid-alloy has a same chemical composition, and one layer of the plurality of layers of the solid-alloy has a chemical composition different from at least one other layer of the plurality of layers of the solid-alloy.

14. The rotating mechanism of claim 11, wherein the rotating mechanism is a centrifugal pump, and wherein the part is one of: an impeller and a seal ring of the centrifugal pump.

* * * * *